United States Patent
Jia et al.

(10) Patent No.: US 9,853,770 B2
(45) Date of Patent: Dec. 26, 2017

(54) SYSTEMS AND METHODS FOR CIRCULAR CONVOLUTION

(71) Applicant: Huawei Technologies Co., Ltd., Shenzhen (CN)

(72) Inventors: Ming Jia, Ottawa (CA); Mohammad Javad Abdoli, Kanata (CA); Jianglei Ma, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/946,413

(22) Filed: Nov. 19, 2015

(65) Prior Publication Data

US 2016/0105258 A1   Apr. 14, 2016

Related U.S. Application Data

(63) Continuation of application No. 14/511,872, filed on Oct. 10, 2014, now Pat. No. 9,209,936.

(51) Int. Cl.
*H04L 27/26* (2006.01)
*H04L 1/00* (2006.01)
(Continued)

(52) U.S. Cl.
CPC ...... *H04L 1/0054* (2013.01); *H04L 25/03159* (2013.01); *H04L 25/067* (2013.01);
(Continued)

(58) Field of Classification Search
CPC   H04L 1/0054; H04L 27/2698; H04L 27/2647
See application file for complete search history.

(56) References Cited

U.S. PATENT DOCUMENTS

| | | | |
|---|---|---|---|
| 2004/0083417 A1* | 4/2004 | Lane | H03M 13/356 714/758 |
| 2014/0233437 A1 | 8/2014 | Abdoli et al. | |
| 2014/0233664 A1 | 8/2014 | Abdoli et al. | |

FOREIGN PATENT DOCUMENTS

| | | |
|---|---|---|
| CN | 101605120 A | 12/2009 |
| CN | 103428154 A | 12/2013 |

(Continued)

OTHER PUBLICATIONS

Abdoli, M.J. et al., "Weighted Circularly Convolved Filtering in OFDM/OQAM," 2013 IEEE 24th International Symposium on Personal, Indoor and Mobile Radio Communications: Fundamentals and PHY Track, 5 pages.

*Primary Examiner* — Jaison Joseph
(74) *Attorney, Agent, or Firm* — Slater Matsil, LLP

(57) ABSTRACT

System and method embodiments are provided for a receiver for circularly convolved signals. In an embodiment, a universal decoder for a circularly convolved signal includes a first decoder configured to decode the circularly convolved signal; a second decoder configured to decode a plurality of symbol lengths signal from a first portion of the circularly convolved signal, wherein the plurality of symbol lengths signal is time aligned with the circularly convolved signal before passing through the second decoder; and an adder component configured to sum a first decoder output coming from the first decoder and a second decoder output coming from the second decoder to produce a symbol value from which a log likelihood ratio (LLR) output is obtained.

20 Claims, 7 Drawing Sheets

(51) Int. Cl.
*H04L 25/03* (2006.01)
*H04L 25/06* (2006.01)

(52) U.S. Cl.
CPC ...... *H04L 27/2647* (2013.01); *H04L 27/2652* (2013.01); *H04L 27/2698* (2013.01)

(56) References Cited

FOREIGN PATENT DOCUMENTS

WO   2013152249 A1   10/2013
WO   2014127715 A1   8/2014

\* cited by examiner

SYSTEMS AND METHODS FOR CIRCULAR CONVOLUTION

This is a continuation application of U.S. patent application Ser. No. 14/511,872, filed on Oct. 10, 2014, titled "Systems and Methods for Circular Convolution," and is incorporated herein by reference.

TECHNICAL FIELD

The present invention relates to a system and method for wireless communications, and, in particular, to a system and method for compensating for abrupt channel change in circularly convolved signals.

BACKGROUND

In wireless communications, orthogonal frequency division multiplexing (OFDM) may be used as a waveform structure. OFDM has many advantages, including the ease of implementation using fast Fourier transform (FFT) and inverse FFT (IFFT) and robustness against multi-path fading. However, OFDM has drawbacks, such as spectral inefficiency from cyclic-prefix (CP) and frequency guard bands.

OFDM-offset quadrature amplitude modulation (OQAM) is a multi-carrier transmission technique which uses time-frequency localized orthogonal prototype filters, such as root-raised cosine (RRC) and isotropic orthogonal transform algorithm (IOTA) pulse shapes. OFDM-OQAM has a superior power spectral density (PSD) side-lobe decay compared to OFDM. Hence, OFDM-OQAM may reduce the guard band overhead compared to OFDM. For example, in a long term evolution (LTE) system, the overhead may be reduced by 10%, in addition to the gain in spectral efficiency from CP removal. However, OFDM-OQAM incurs an overhead from transmission times of tails at both ends of a transmission burst. OFDM-OQAM has an overhead due to the T/2 time offset between the OQAM symbols, where T is the symbol duration. The total overhead duration is equal to the length of the prototype filter, minus T/2. The length of the prototype filter may be at least 4T to preserve an acceptable inter-symbol interference (ISI) and inter-carrier interference (ICI). For a burst length of 28 OQAM symbols, this is 7/28=25% overhead in time.

Circular convolution has been used in OFDM-OQAM to remove the overhead associated with the pulse tails. It was first proposed in generalized frequency division multiplexing (GFDM) and was later extended to OFDM-OQAM. All the circular convolution based signaling uses the assumption that the channel remains constant in the period for circular convolution. However, in a cellular system, this assumption is often not true. When this happens, the orthogonality between the signal pulses is lost.

SUMMARY

In an embodiment, a universal decoder for a circularly convolved signal includes a first decoder configured to decode the circularly convolved signal; a second decoder configured to decode a plurality of symbol lengths obtained from a first portion of the circularly convolved signal, wherein the plurality of symbol lengths is time aligned with the circularly convolved signal before passing through the second decoder; and an adder component configured to sum a first decoder output coming from the first decoder and a second decoder output coming from the second decoder to produce a symbol value from which a log likelihood ratio (LLR) output is obtained.

In an embodiment, a method for receiving a circularly convolved signal includes passing the circularly convolved signal through a first decoder; passing a plurality of symbol length signal obtained from a portion of the circularly convolved signal through a second decoder, the plurality of symbol length signal is time aligned with the circularly convolved signal before passing through the second decoder; and summing the outputs of the first and second decoder for log likelihood ratio (LLR) de-mapping.

In an embodiment, a network component includes a transmitter and a receiver, wherein the receiver includes a first decoder for decoding a circularly convolved signal; a second decoder for decoding a plurality of symbol lengths signal obtained from a first portion of the circularly convolved signal, wherein the plurality of symbol lengths signal is time aligned with the circularly convolved signal before passing through the second decoder; and an adder component for summing a first decoder output coming from the first decoder and a second decoder output coming from the second decoder to produce a symbol value from which a log likelihood ratio (LLR) output is obtained.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
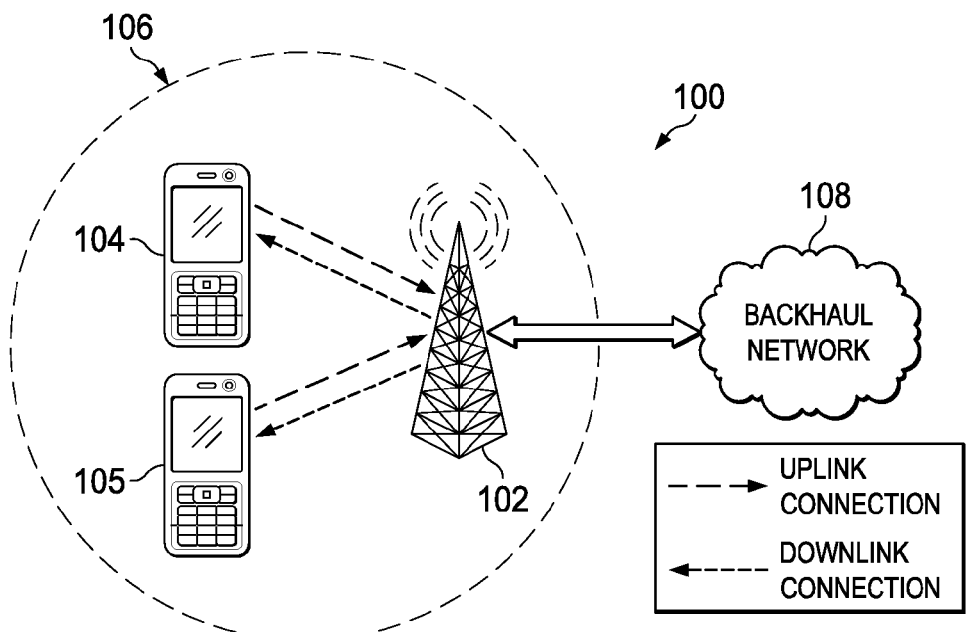
FIG. 1 illustrates network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

An OFDM-OQAM receiver may feed the received signal into a poly-phase filter (PPF) decoder. This works well for a weighted circularly convolved (WCC) signal when the channel is static in time. However, when the channel is not static in time, significant self-interference can occur at the edge of the reconstructed WCC signal.

Disclosed herein are various embodiments about systems and methods to compensate for channel discontinuity resulting from user equipment (UE) mobility in a wireless network for circularly convolved signals. In an embodiment, the receiver is separated into two parts: one for the received signal and the other for the circularly attached signal. The disclosed systems and methods compensate for the channel discontinuity at the edge of the circular operation for the circularly attached signal. The outputs of the two signals are aligned in time and then added together. After passing through the channel equalizer component and QAM soft demapper, the log likelihood ratio (LLR) output will be weighted appropriately with channel discontinuity taken into account. The compensation is performed at the joint point where the channel discontinuity occurs. Thus, it does not matter how fast the UE moves or how long it takes for the channel to change.

Disclosed herein is an embodiment of a method for splitting a WCC signal into two separate sequences along the edge. The two signals pass through two separate PPFs. The circular part of the signal is weighted with the compensated channel to remove the abrupt change of the channel and the two outputs (e.g., from the original signal passing through the first PPF and the compensated signal passing through the second PPF) are summed along the time line. In an embodiment, the LLR output is weighted with channel compensation being taken into account. The cost incurred in the disclosed method is two separate PPFs, but only for the overlapping part (i.e., about the length of four OFDM-OQAM symbol lengths). For the remainder of the signal burst, only one PPF is needed. Thus, the disclosed systems and methods compensate for the abrupt channel change for the short output sequence. The output from the two PPFs are combined for LLR de-mapping.

An advantage of the disclosed systems and methods is that a universal decoder can be used regardless of the terminal mobility. Another advantage of some embodiments of the disclosed systems and methods is that it is not necessary to worry about the mobility of the UE and the transmitter does not have to tell the receiver what to do through signaling, thereby reducing overhead through less signaling. In an embodiment, if the channel does not change, then no compensation is performed. In embodiments, the circularly convolved OFDM-OQAM is immune to user mobility.

Although described herein primarily with reference to OFDM-OQAM, it should be recognized that the disclosed systems and methods are not limited to OFDM-OQAM, but can be applied to any circularly convolved signal, such as, for example, Generalized Frequency Division Multiplexing (GFDM).

An OFDM-OQAM can be expressed as a linear convolution of the input (up-sampled) OQAM sequence with a bank of frequency-modulated versions of the prototype filter. In an embodiment, the operation of a linear convolution is imitated in circular convolution, but with a compensated channel. In an embodiment, the same modulator is used at the transmitter and the same demodulator is used at the receiver regardless of UE mobility.

In an embodiment, a universal decoder independent of terminal mobility for a circularly convolved signal includes a first decoder for decoding the circularly convolved signal; a second decoder for decoding a copied first plurality of symbol lengths from the circularly convolved signal, wherein the copied first plurality of symbol lengths is time aligned with the circularly convolved signal before passing through the second decoder; and an adder component for summing a first output of the first decoder and a second output of the second decoder to produce a sequence of unequalized signal output. In an embodiment, the decoder includes a multiplier component for weighting a circular part of the signal with weighting factor determined according to a compensated channel to remove an abrupt change of the channel. In an embodiment, the weighting factor is determined according to $h_N h_1^*/|h_1|^2$, where $h_1$ is a channel at the beginning of the circularly convolved signal and $h_N$ is a channel at the end of the circularly convolved signal. In an embodiment, the decoders are linear OFDM-OQAM decoders. In an embodiment, the decoders are poly-phase filters (PPFs). In an embodiment, the adder component is configured to weight the LLR output is normalized or equalized with a weighting factor with channel compensation taken into account. In an embodiment, the weighting factor is given by $$\frac{2|h_1|^2|h_N|^2}{|h_1|^2 + |h_N|^2}$$

where $h_1$ is a channel at the beginning of the circularly convolved signal and $h_N$ is a channel at the end of the circularly convolved signal.

In an embodiment, a method for receiving a circularly convolved signal includes copying a plurality of first signal lengths from the circularly convolved signal; passing the circularly convolved signal through a first decoder; passing the copied signal through a second decoder; and summing the outputs of the first and second decoder for channel equalization and log likelihood ratio (LLR) de-mapping. In an embodiment, the method further includes time aligning the circularly convolved signal and the copied signal and weighting a circular part of the signal with a weighting factor according to a compensated channel to remove an abrupt change of the channel. In an embodiment, the method also includes weighting the LLR de-mapping output with a weighting factor according to channel compensation. In an embodiment, the plurality of first signal lengths is about four symbol lengths. In an embodiment, the plurality of first signal lengths is a length of a prototype filter minus T/2, where T is an offset quadrature amplitude modulation (OQAM) symbol duration.

FIG. 1 illustrates network 100 for communicating data. Network 100 comprises communications controller 102 having a coverage area 106, a plurality of user equipment (UEs), including UE 104 and UE 105, and backhaul network 108. Two UEs are depicted, but many more may be present. Communications controller 102 may be any component capable of providing wireless access by, inter alia, establishing uplink (dashed line) and/or downlink (dotted line) connections with UE 104 and UE 105, such as a base station, an enhanced base station (eNB), a picocell, a femtocell, and other wirelessly enabled devices. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end (not shown). In some embodiments, the network 100 may comprise various other wireless devices, such as relays, femtocells, etc.

Figure 2:
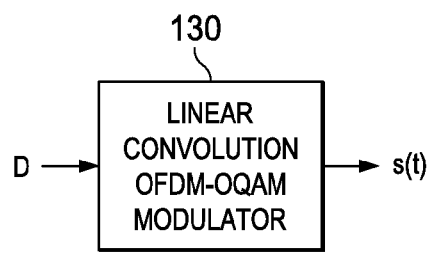
FIG. 2 illustrates a flowchart for a method of linear convolution modulation.

FIG. 2 illustrates a flowchart for a method of linear convolution OFDM-OQAM modulation. An input data burst D is linearly convolved by linear convolution OFDM-OQAM modulator 130 to produce output signal s(t). An example data burst is given by:

$$D = \begin{bmatrix} d_{0,1} & d_{0,2} & \cdots & d_{0,N} \\ d_{1,1} & d_{1,2} & \cdots & d_{1,N} \\ \vdots & \vdots & \ddots & \vdots \\ d_{2M-1,1} & d_{2M-1,2} & \cdots & d_{2M-1,N} \end{bmatrix},$$

where the columns correspond to frequency and the rows correspond to time. In data burst D, there are 2M subcarriers, and N symbols in time.

In linear convolution OFDM-OQAM modulation, a sequence of OQAM symbols is modulated over a set of real-orthogonal pulse shapes. The pulse shapes are obtained by shifting a symmetrical real-valued prototype filter p(t) in time and frequency. For a continuous time OFDM-OQAM signal, the modulator output may be written as:

$$s(t) = \sum_{n=-\infty}^{+\infty} \sum_{k=0}^{M-1} d_{2k,2n} p(t-nT) e^{\frac{j2\pi(2k)t}{T}} + j \cdot d_{2k,2n+1} p\left(t - \frac{T}{2} - nT\right) e^{\frac{j2\pi(2k)t}{T}} + j \cdot d_{2k+1,2n} p(t-nT) e^{\frac{j2\pi(2k+1)t}{T}} + d_{2k+1,2n+1} p\left(t - \frac{T}{2} - nT\right) e^{\frac{j2\pi(2k+1)t}{T}}.$$

The real-valued constellation points are given by $d_{k,n}$. The real-valued constellation points may be, for example, pulse-amplitude modulating (PAM) symbols or real or imaginary parts of quadrature amplitude modulation (QAM) symbols. The number of subcarriers is 2M, the subcarrier spacing is 1/T, and the time spacing between two consecutive OQAM symbols is T/2. The real-orthogonality implies that:

$$R\left\{ \int_{-\infty}^{+\infty} p\left(t - \frac{nT}{2}\right) p\left(t - \frac{n'T}{2}\right) \times e^{\frac{j2\pi(m'-m)t}{T}} e^{j2\pi(\varphi_{m',n'} - \varphi_{m,n})} dt \right\} = \delta_{m,m'} \delta_{n,n'},$$

where:

$$\varphi_{m,n} \triangleq \frac{\pi}{2}(m+n).$$

The discrete-time formulation of OFDM-OQAM transmission is realized by sampling the continuous-time signal with a sampling period of:

$$T_s = \frac{T}{2M}.$$

That is:

$$s(m) = \sum_{n=-\infty}^{+\infty} \sum_{k=0}^{2M-1} d_{k,n} p(m-nM) e^{\frac{j2\pi km}{2M}} e^{j\varphi_{k,n}}.$$

Figure 3:
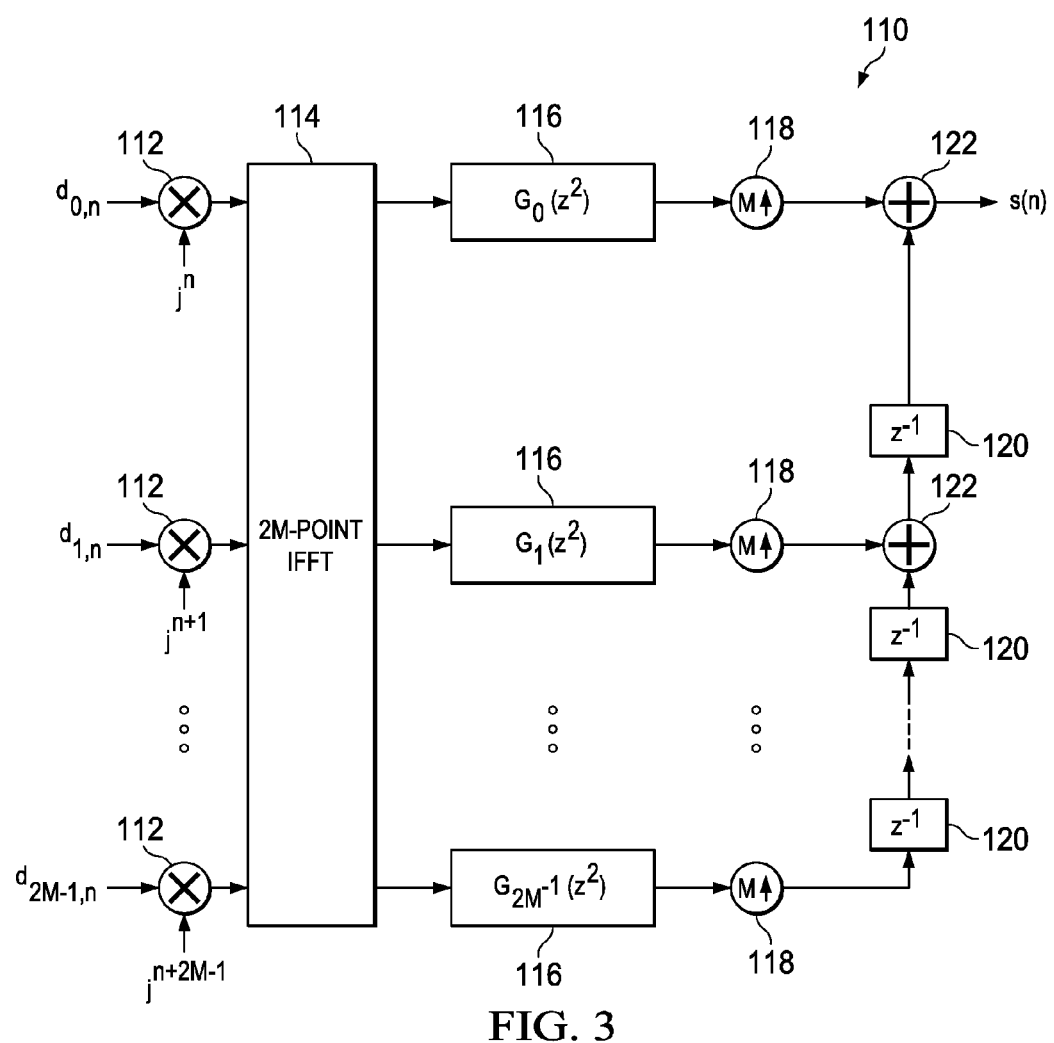
FIG. 3 illustrates a flowchart for a method of linear convolution demodulation.

FIG. 3 illustrates OFDM-OQAM modulator poly-phase structure 110 which may be used to implement OFDM-OQAM modulation. The input data points are $d_{k,n}$, where k represents the subcarrier and n represents the symbol in time. The inputs are multiplied by $j^{n+k}$ in multiplier blocks 112. Then, IFFT block 114, a 2M-point IFFT, performs IFFT. After IFFT block 114, linear convolution filters 116 perform linear convolution using transfer functions $G_k(z^2)$. Expansion blocks 118 expand the outputs of linear convolution filters 116 by a factor M. The outputs of expansion blocks 118 are then time shifted by time shift blocks 120, and added by adders 122 to produce output signals(n).

Figure 4:
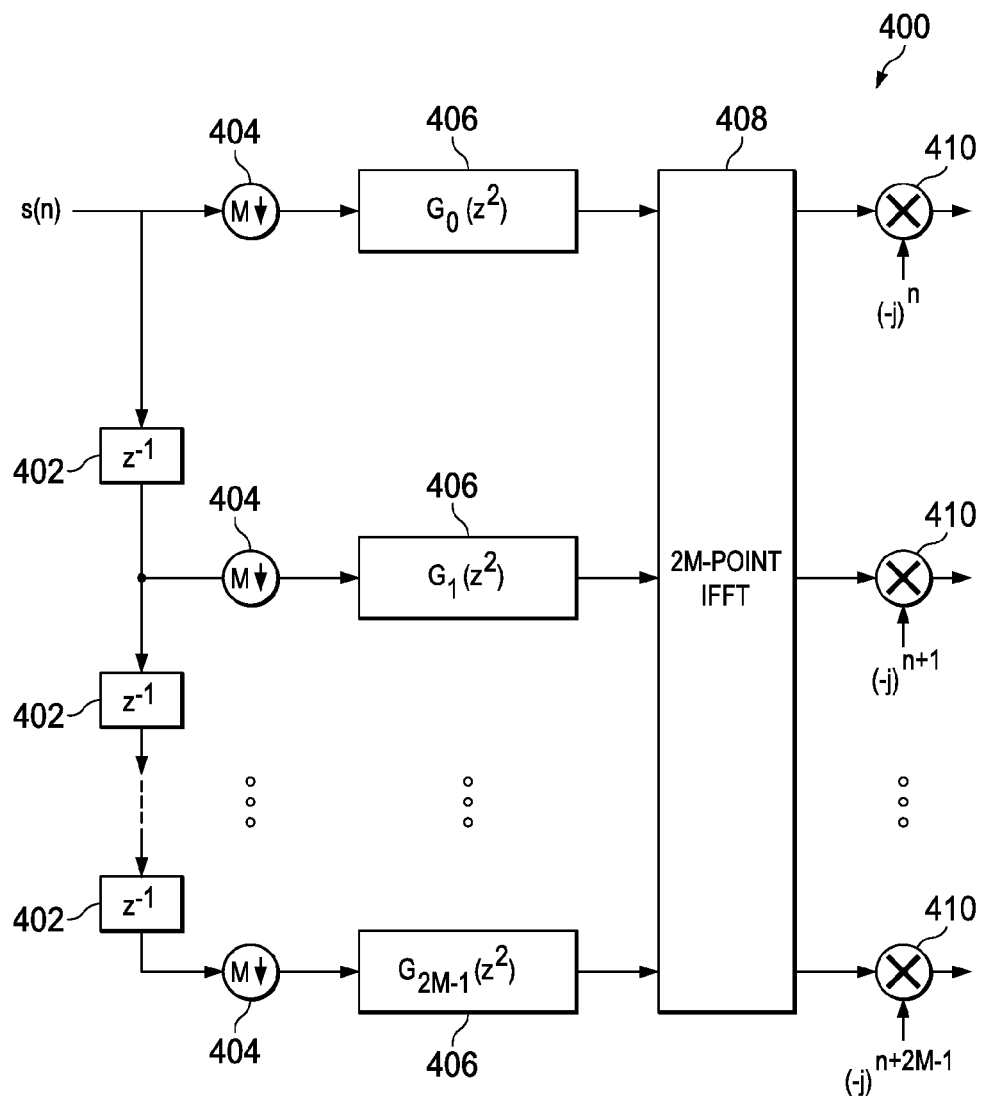
FIG. 4 illustrates an embodiment OFDM-OQAM modulator poly-phase structure which may be used to implement OFDM-OQAM modulation.

FIG. 4 illustrates an OFDM-OQAM demodulator poly-phase structure 400 which may be used to implement OFDM-OQAM demodulation. The input data signal is s(n) where n represents the symbol in time. The input data signal s(n) is split and time shifted by time shift blocks 402. The output of the time shift blocks 402 is condensed by condensing blocks 404 by a factor M. The outputs of the condensing blocks 404 are passed through linear convolution filters 406 that perform linear convolution using transfer functions $G_k(z^2)$. The IFFT block 408, a 2M-point IFFT, performs IFFT on the output of the convolution filters 406. The outputs of the IFFT block 408 is multiplied by $(-j)^{n+k}$ in multiplier block 410 to produce the output non-equalized data points, where k represents the subcarrier and n represents the symbol in time.

Figure 5:
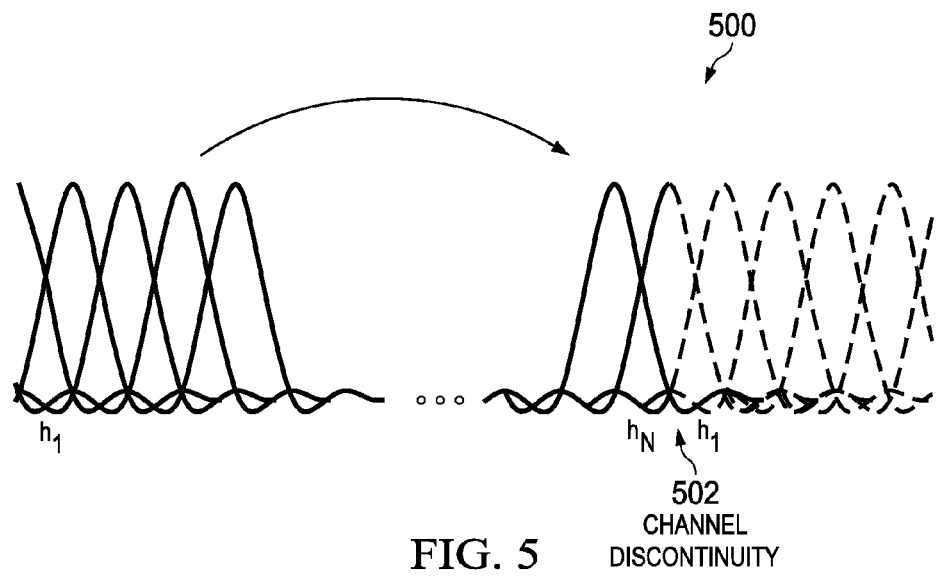
FIG. 5 is a graph illustrating channel discontinuity.

FIG. 5 is a graph 500 illustrating channel discontinuity. Graph 500 shows the copy-and-append operation that is performed in a regular receiver for circular convolution OFDM-OQAM. In this operation, the first part of the signal is copied and appended to the end of the signal (and the resulting signal is passed through a single linear OFDM-OQAM decoder). A channel discontinuity occurs at point 502 between $h_N$ and $h_1$. A channel discontinuity causes a loss of orthogonality. Thus, if they are no longer orthogonal, the symbol across the channel $h_1$ to $h_N$ is useless. In order to mitigate this discontinuity, in an embodiment, the first part of the signal is copied and shifted in time and processed through a second OFDM-OQAM decoder and the output of the decoder is weighted appropriately as described below with reference to FIG. 6.

Figure 6:
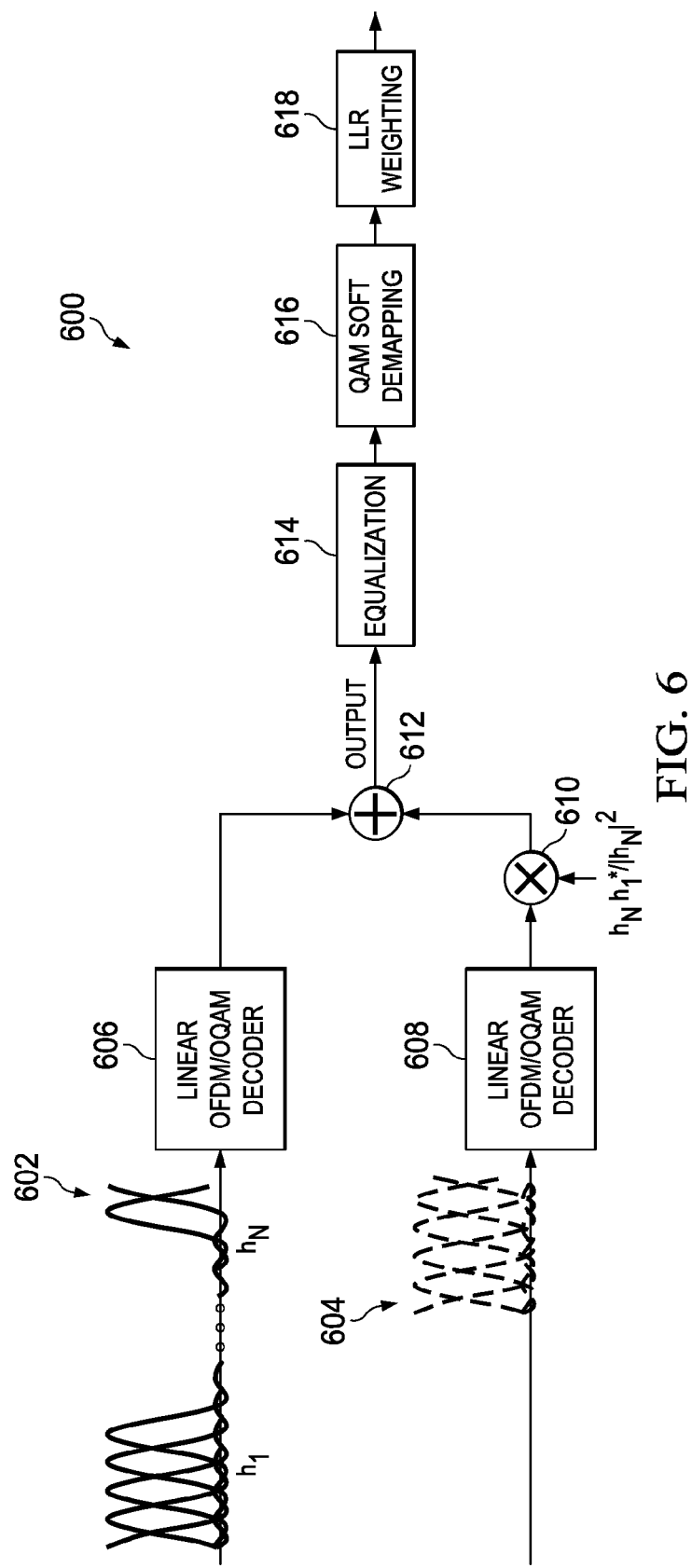
FIG. 6 illustrates an embodiment system for a circularly convolved decoder.

FIG. 6 illustrates an embodiment system 600 for a circularly convolved decoder. System 600 includes two linear OFDM-OQAM decoders 606, 608. The first linear OFDM-OQAM decoder 606 normally operates similar to demodulator 150 in FIG. 3. System 600 also includes a multiplier 610, an adder 612, an equalization component 614, a QAM soft demapping component 616, and an LLR weighting component 618. The beginning portion of the transmission burst is copied to the input of the second decoder 608 and time aligned with the last portion of the transmission burst. The multiplier weights the first portion of the transmission burst. In an embodiment, the duration of the first portion of time is equal to the duration of a prototype filter minus T/2 (i.e., the overhead of the linear convolution OFDM-OQAM which is removed in circular convolution OFDM-OQAM), where T is OQAM symbol duration time. In an embodiment, the weighting removes the abrupt channel change. However, in an embodiment, due to this weighting, the LLR output is properly weighted by taking this first weighting into account. The multiplier 610 removes the effect of $h_1$ and masks the pulse as it goes through channel $h_N$. In an embodiment, the multiplier 610 multiplies the output of decoder 608 by a weighting function given by the value of $$\frac{h_n h_1^*}{|h_1|^2},$$

where $h_1$ is a channel value at the beginning of the circularly convolved signal, $h_N$ is a channel value at the end of the circularly convolved signal, $h_1^*$ is the complex conjugate of $h_1$, and $|h_1|$ is the amplitude of $h_1$. The channel value, $h_i$, is the estimated channel value at time i and may be a complex value. The output of the second decoder 608 and multiplier 610 is added to the output of the first decoder 606 and the output from the adder 612 is the de-mapped symbol. The de-mapped symbol is passed through equalization component 614 to equalize the de-mapped symbol to remove the channel effect for QAM. The output from the equalization component 614 is passed through the QAM soft demapping component 616, which generates an unweighted LLR. The output (unweighted LLR) from the QAM soft demapping component 616 is passed through the LLR weighting component 518 which weights each unweighted LLR by a respective signal-to-interference-plus-noise ratio (SINR) which takes the channel weighting performed earlier at the demodulation stage into account.

In an embodiment, the multiplier 610 is placed before the decoder 608 instead of after as shown in FIG. 6.

Figure 7:
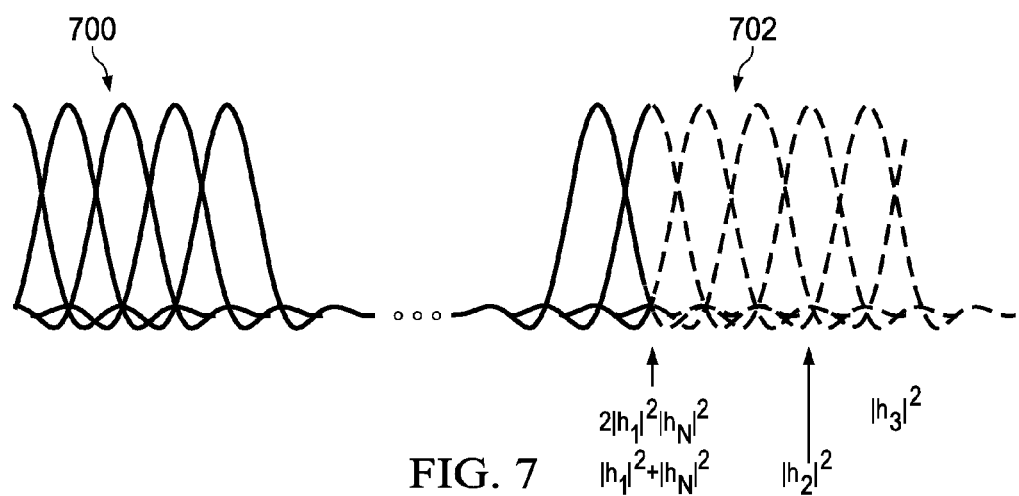
FIG. 7 illustrates a graph of a transmission burst with a discontinuity and an LLR weighting function utilized for the reconstructed symbol.

FIG. 7 illustrates a graph 700 of a transmission burst with a discontinuity and an LLR weighting function utilized for the reconstructed symbol. Graph 700 shows a discontinuity at point 702. A weighting function is used to aid in symbol reconstruction. In an embodiment, the weighting function is a LLR. In an embodiment, the weighting function is given by $$\frac{2|h_1|^2|h_N|^2}{|h_1|^2+|h_N|^2}$$

where $h_1$ is a channel at the beginning of the circularly convolved signal, $h_N$ is a channel at the end of the circularly convolved signal, $|h_1|$ is the amplitude of $h_1$, and $|h_N|$ is the amplitude of $h_N$. In an embodiment, it may be necessary to pay special attention to the LLR weighting for the reconstructed symbol at the end of the transmitted signal burst because the channel compensation step may cause "noise enhancement." In an embodiment, the LLR output of each demapped QAM symbol is weighted by the SNR of that particular symbol to reduce the effect of "noise enhancement."

Figure 8:
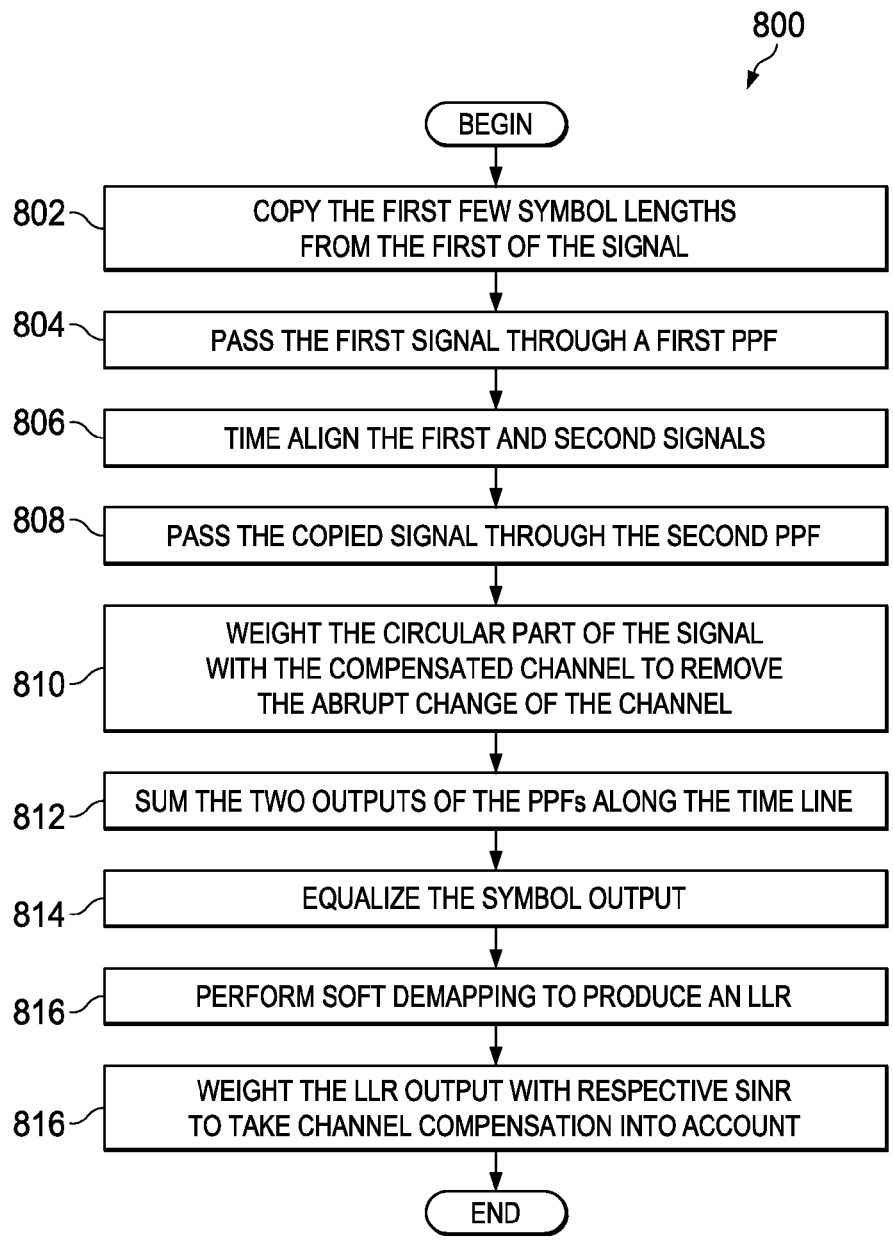
FIG. 8 is a flowchart of an embodiment method for obtaining a symbol from a circularly convoluted signal at a discontinuity.

FIG. 8 is a flowchart of an embodiment method 800 for obtaining a symbol from a circularly convoluted signal at a discontinuity. The method 800 begins at block 802 where the first few symbol lengths of the first signal are copied. At block 804, the first signal is passed through a first PPF. AT block 806, the first and second signals are time aligned and at block 808, the copied signal (that includes just the first few symbol lengths from the beginning or first of the signal) is passed through the second PPF. At block 810, the circular part of the signal is weighted with the compensated channel to remove the abrupt change of the channel. At block 812, the two outputs from the two PPFs are summed along the time line to produce a demodulated symbol output. At block 814, the demodulated symbol output is equalized. At block 816, the equalized symbol output is soft demapped to produce an unweighted LLR. At block 818, the unweighted LLR output is weighted with channel compensation taken into account, after which, the method 800 ends.

Figure 9:
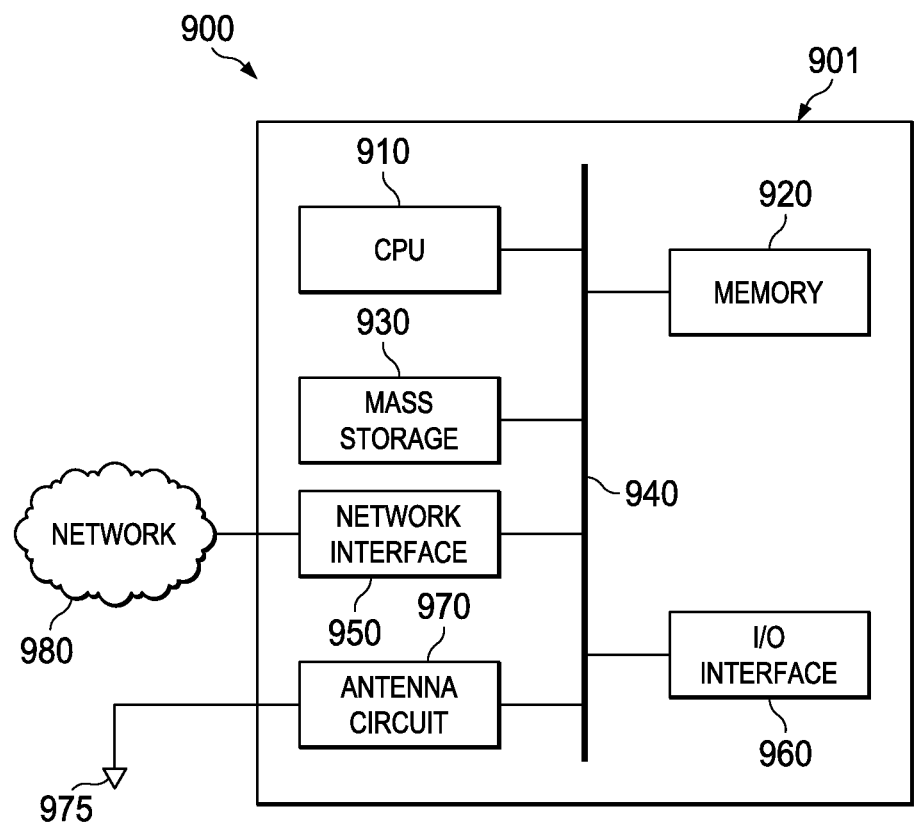
FIG. 9 is a block diagram of a processing system that may be used for implementing the devices and methods disclosed herein.

FIG. 9 is a block diagram of a processing system 900 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 900 may comprise a processing unit 901 equipped with one or more input/output devices, such as a speaker, microphone, mouse, touchscreen, keypad, keyboard, printer, display, and the like. The processing unit 901 may include a central processing unit (CPU) 910, memory 920, a mass storage device 930, a network interface 950, an I/O interface 960, and an antenna circuit 970 connected to a bus 940. The processing unit 901 also includes an antenna element 975 connected to the antenna circuit.

The bus 940 may be one or more of any type of several bus architectures including a memory bus or memory controller, a peripheral bus, video bus, or the like. The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs.

The mass storage device 930 may comprise any type of storage device configured to store data, programs, and other information and to make the data, programs, and other information accessible via the bus 940. The mass storage device 930 may comprise, for example, one or more of a solid state drive, hard disk drive, a magnetic disk drive, an optical disk drive, or the like.

The I/O interface 960 may provide interfaces to couple external input and output devices to the processing unit 901. The I/O interface 960 may include a video adapter. Examples of input and output devices may include a display coupled to the video adapter and a mouse/keyboard/printer coupled to the I/O interface. Other devices may be coupled to the processing unit 901 and additional or fewer interface cards may be utilized. For example, a serial interface such as Universal Serial Bus (USB) (not shown) may be used to provide an interface for a printer.

The antenna circuit 970 and antenna element 975 may allow the processing unit 901 to communicate with remote units via a network. In an embodiment, the antenna circuit 970 and antenna element 975 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 970 and antenna element 975 may also provide Bluetooth and/or WiFi connection to other devices.

The processing unit 901 may also include one or more network interfaces 950, which may comprise wired links, such as an Ethernet cable or the like, and/or wireless links to access nodes or different networks. The network interface 901 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A universal decoder, comprising:
a first decoder operable to decode a first signal;
a second decoder operable to decode a copy of at least a portion of the first signal;
an adder component operable to produce a symbol value from which a log likelihood ratio (LLR) output is obtained, the symbol value comprising a sum of a first decoder output and a second decoder output; and
an equalizer component to remove a channel effect from the symbol.

2. The universal decoder of claim 1, wherein the second decoder is operable to decode a plurality of symbol lengths obtained from a first portion of the signal, wherein the plurality of symbol lengths is time aligned with the signal.

3. The universal decoder of claim 1, wherein the signal comprises a circularly convolved signal.

4. The universal decoder of claim 1, further comprising a multiplier component configured to weight a circular part of the signal with a weighting factor in order to remove an abrupt change of a channel, wherein the weighting is determined according to a compensated channel.

5. The universal decoder of claim 4, wherein the weighting factor is determined according to $$\frac{h_n h_1^*}{|h_1|^2},$$

where $h_1$ is a channel value at the beginning of the circularly convolved signal, $h_N$ is a channel value at the end of the circularly convolved signal, $h_1^*$ is the complex conjugate of $h_1$, and $|h_1|$ is the amplitude of $h_1$.

6. The universal decoder of claim 1, wherein the universal decoder comprise linear orthogonal frequency division multiplexing (OFDM)-offset quadrature amplitude modulation (OQAM) decoders.

7. The universal decoder of claim 1, wherein the universal decoder comprises poly-phase filters.

8. The universal decoder of claim 2, wherein the plurality of symbol lengths comprises a length of prototype filter minus T/2, where T is an offset quadrature amplitude modulation (OQAM) symbol duration.

9. The universal decoder of claim 1, further comprising an LLR weighting component configured to weight the LLR output with a weighting factor with channel compensation taken into account.

10. The universal decoder of claim 9, wherein the weighting factor is given by $$\frac{2|h_1|^2|h_N|^2}{|h_1|^2 + |h_N|^2}$$

where $h_1$ is a channel at the beginning of the circularly convolved signal, $h_N$ is a channel at the end of the circularly convolved signal, $|h_1|$ is the amplitude of $h_1$, and $|h_N|$ is the amplitude of $h_N$.

11. The universal decoder of claim 1, further comprising:
a quadrature amplitude modulation (QAM) soft demapping component to generate an unweighted LLR.

12. A method for receiving a signal, the method comprising:
passing the signal through a first decoder;
passing a copy of a first portion of the signal through a second decoder;
obtaining a log likelihood ratio (LLR) de-mapping output according to a sum of the outputs of the first and second decoder; and
removing a channel effect from the symbol.

13. The method of claim 12, wherein the second decoder is operable to decode a plurality of symbol lengths obtained from a first portion of the signal, wherein the plurality of symbol lengths is time aligned with the signal.

14. The method of claim 12, wherein the signal comprises a circularly convolved signal.

15. The method of claim 14, further comprising weighting a circular part of the signal with a weighting factor according to a compensated channel to remove an abrupt change of the channel.

16. The method of claim 15, wherein the weighting factor is determined according to $$\frac{h_n h_1^*}{|h_1|^2},$$

where $h_1$ is a channel value at the beginning of the circularly convolved signal, $h_N$ is a channel value at the end of the circularly convolved signal, $h_1^*$ is the complex conjugate of $h_1$, and $|h_1|$ is the amplitude of $h_1$.

17. The method of claim 12, further comprising weighting the LLR de-mapping output with a weighting factor according to channel compensation.

18. A network component, comprising:
a transmitter; and
a receiver, wherein the receiver comprises:
a first decoder operable to decode a first signal;
a second decoder operable to decode a copy of at least a portion of the first signal; and
an adder component operable to produce a symbol value from which a log likelihood ratio (LLR) output is obtained, the symbol value comprising a sum of a first decoder output and a second decoder output; and
an equalizer component to remove a channel effect from the symbol.

19. The network component of claim 18, further comprising a multiplier component for weighting a circular part of the signal with a weighting factor determined according to a compensated channel to remove an abrupt change of the channel.

20. The network component of claim 18, wherein the signal comprises a circularly convolved signal and wherein the second decoder is operable to decode a plurality of symbol lengths obtained from a first portion of the circularly convolved signal, wherein the plurality of symbol lengths is time aligned with the circularly convolved signal.

* * * * *